(12) United States Patent
Montgelard (10) Patent No.: US 11,612,274 B2
(45) Date of Patent: Mar. 28, 2023

(54) REMOVABLE HANDLE EQUIPPED WITH A MOVABLE LATCH

(71) Applicant: SEB S.A., Ecully (FR)

(72) Inventor: Michel Montgelard, Aix-les-Bains (FR)

(73) Assignee: SEB S.A.

( * ) Notice: Subject to any disclaimer, the term of this patent is extended or adjusted under 35 U.S.C. 154(b) by 173 days.

(21) Appl. No.: 17/171,420

(22) Filed: Feb. 9, 2021

(65) Prior Publication Data

US 2021/0298534 A1 Sep. 30, 2021

(30) Foreign Application Priority Data

Mar. 30, 2020 (FR) ..................................... 2003105

(51) Int. Cl.
*A47J 45/07* (2006.01)
(52) U.S. Cl.
CPC .................................. *A47J 45/071* (2013.01)
(58) Field of Classification Search
CPC .................................................. A47J 45/071
USPC ............................................. 220/573.1, 759
See application file for complete search history.

(56) References Cited

U.S. PATENT DOCUMENTS

| | | | |
|---|---|---|---|
| 3,203,029 A | 8/1965 | Serio | |
| 7,611,179 B2* | 11/2009 | Lorthioir | A47J 45/10 220/759 |
| 7,883,129 B2* | 2/2011 | Jung | A47J 45/10 220/759 |
| 2006/0096996 A1* | 5/2006 | Lorthioir | A47J 45/10 220/759 |
| 2009/0039096 A1* | 2/2009 | Lorthioir | A47J 45/10 220/573.1 |
| 2009/0045207 A1* | 2/2009 | Lorthioir | A47J 45/10 220/759 |

(Continued)

FOREIGN PATENT DOCUMENTS

| | | |
|---|---|---|
| EP | 2623003 A2 | 8/2013 |
| EP | 3319497 B1 | 5/2019 |
| WO | 2009136678 A1 | 11/2009 |

OTHER PUBLICATIONS

French Search Report for Application No. FR2003105, dated Nov. 11, 2020, pp. 1-2.

*Primary Examiner* — J. Gregory Pickett
*Assistant Examiner* — Niki M Eloshway
(74) *Attorney, Agent, or Firm* — Lerner, David, Littenberg, Krumholz & Mentlik, LLP (57) ABSTRACT

A removable handle is designed to cooperate with a cooking container having a side wall extended upwards by an outwardly-curved portion including a free end and includes a latch that can be moved between an open and a closed positions. The latch includes a locking panel designed to generate a force on the free end in the closed position, under the action of a means of pressurization, the force having a vertical component F for locking the free end against an upper supporting body. The latch has a protruding body and the handle includes a hollow body or reciprocally. In the closed position, the protruding body and the hollow body are fitted into each other to prevent the latch from recoiling when the free end generates, on the locking panel, a force having a component F1 opposite to the vertical component F with an intensity greater than a predetermined value.

11 Claims, 6 Drawing Sheets

(56) References Cited

U.S. PATENT DOCUMENTS

2013/0140321 A1* 6/2013 Montgelard .......... A47J 45/071
                                                              294/34
2014/0158701 A1* 6/2014 Bonnel ................ A47J 45/071
                                                              220/759

* cited by examiner

REMOVABLE HANDLE EQUIPPED WITH A MOVABLE LATCH

This application claims priority from French application number 2003105, filed Mar. 30, 2020, the disclosure of which is hereby incorporated herein by reference.

This invention relates to a removable handle designed to cooperate with a cooking container, said cooking container, such as a saucepan, a frying pan or a stewpot, having a side wall that is extended upwards by an outwardly-curved portion.

Document EP3319497 discloses a removable handle designed to cooperate with a cooking container having a side wall that is extended upwards by an outwardly-curved portion comprising a free end. The removable handle extends in a longitudinal direction and comprises an inner supporting body and an outer supporting body designed to rest against, respectively, an inner surface and an outer surface of the side wall, as well as an upper supporting body designed to rest against the free end of the curved portion. The removable handle comprises a latch that can be moved between an open position and a closed position. The latch comprises a locking panel designed to be distant from the inner supporting body when the latch is in the open position and designed to generate a force on the free end when the latch is in the closed position, under the action of a means of pressurization. The force comprises a vertical component that locks the free end of the curved portion against the upper supporting body.

Thus, when the removable handle is assembled on a cooking container, the latch is in the closed position, the side wall is held between the inner and outer supporting bodies and the curved portion is held between the upper supporting body and the locking panel.

However, in special use cases, particularly if the user wants to flip the food contained in the cooking container and, holding the removable handle on the cooking container, makes an up-and-down movement with the cooking container and abruptly slows the movement at the end, the free end of the curved portion then generates a force on the locking panel that counters the force of the means of pressurization and which tends to cause the latch to recoil.

Thus, the user may feel a parasitic displacement that appears between the removable handle and the cooking container.

An aspect of this invention may remedy the aforementioned drawbacks and proposes a removable handle designed to cooperate with a cooking container and offering improved support to allow the user to handle it easily and safely.

Another aspect of the present invention proposes a removable handle that has a simple design and can be economically implemented.

According to an embodiment, a removable handle is designed to cooperate with a cooking container having a side wall that is extended upwards by an outwardly-curved portion comprising a free end, said removable handle extending in a longitudinal direction and comprising an inner supporting body and an outer supporting body designed to rest against, respectively, an inner surface and an outer surface of the side wall, as well as an upper supporting body designed to rest against the free end of the curved portion, said removable handle comprising a latch that can be moved between an open position and a closed position, the latch comprising a locking panel designed to be distant from the inner supporting body when the latch is in the open position and designed to generate a force on the free end when the latch is in the closed position, under the action of a means of pressurization, said force comprising a vertical component F for locking the free end of the curved portion against the upper supporting body characterized in that the latch comprises a protruding body and said removable handle comprises a hollow body or reciprocally and in that, in the closed position, the protruding body and the hollow body are fitted into each other to prevent the latch from recoiling when the free end generates on the locking panel a force comprising a component F1 opposite to the vertical locking component F and whose intensity is greater than a predetermined value.

Thus, in case of heavy loads on the free end on the locking panel, the latch is locked in the closed position and can no longer recoil. Consequently, the relative movements between the removable handle and the cooking container are reduced and this improves the safety and quality perceived by the user.

By vertical latching component, it is understood that the component is perpendicular to the longitudinal direction which is substantially horizontal.

Advantageously, the protruding body and the hollow body automatically disengage from each other when the latch leaves the closed position to move to the open position.

Advantageously, the protruding body and the hollow body extend in a vertical plane, parallel to the longitudinal direction in the protruding body or the hollow body can be moved in a vertical direction perpendicular to the longitudinal direction between a locked position in which the latch cannot recoil and an unlocked position in which the latch can recoil.

Thus, when the free end generates on the locking panel a force comprising a component F1 opposite to the vertical locking component F, the protruding body is moved into the hollow body in the direction of the vertical locking component F.

Preferably, the protruding body is arranged near the latching wall.

The latch is guided in the removable handle with an operational play sized to allow the locking panel to move downward in the closed position, and consequently a movement of the protruding body into the hollow body.

Advantageously, the predetermined value of the intensity of the component F1 is greater than 0.05 times the intensity of the vertical component F measured when the latch is in the closed position.

Thus, the protruding body or the hollow body moves into the locking position in which the latch cannot recoil as soon as the blocking panel acts on the free end under the action of the means of pressurization. For example, the predetermined value of the intensity of the component F1 is greater than 1 N.

Advantageously, the hollow body is arranged on a clip attached to the removable handle, said clip comprising the upper supporting body.

Thus, the clip and the latch can be made of a robust metal material and the removable handle can comprise a plastic body that is more economical than a metal material.

Preferably, the protruding body comprises at least one tooth and the hollow body comprises at least one receiving notch in a shape corresponding to the at least one tooth.

Such a collaboration of a tooth and a correspondingly-shaped receiving notch enables the latch to lock efficiently in the closed position.

Advantageously, the at least one tooth comprises a flat face tilted at an angle $\beta$ relative to a vertical direction perpendicular to the longitudinal direction, the angle β being greater than 15° and the at least one notch comprises a flat face tilted at the same angle.

Thus, the at least one tooth can exit the at least one notch without jamming when the latch leaves the closed position.

Preferably, the removable handle comprises a means of returning the latch to the open position that is arranged between the clip and the latch.

Such a provision makes it possible in particular to help the protruding or hollow body to move from the locked position to the unlocked position.

Advantageously, the protruding body comprises a plurality of teeth forming at least a first rack and the hollow body comprises a plurality of receiving notches forming at least a second rack, the first rack and the second rack comprising the same pitch P.

Thus, several teeth and several notches can contribute to locking the latch in the closed position.

Advantageously, the pitch P is less than 2 millimeters.

Preferably, the at least one first rack comprises a first right rack and a first left rack and the at least one second rack comprises a second right rack and a second left rack, the first right racks and the first left racks and the second right racks and the second left rack comprising the same pitch P.

Advantageously, the first right rack and the first left rack extend parallel to the longitudinal direction being offset by half a pitch or the second right rack and the second left rack parallel to the longitudinal direction by being offset by half a pitch.

Thus, the latch in the closed position can be moved before locking for a maximum distance equal to half a pitch either with collaboration of the first right rack with the second right rack or with a collaboration of the first left rack with the second left rack.

Preferably, the latch can be moved in the longitudinal direction and the locking panel is tilted to form with the longitudinal direction, in a vertical cross-section plane comprising the longitudinal direction, an angle α greater than 45°.

Thus, the free end generates on the locking panel and reciprocally a force comprising a vertical locking component that is substantially perpendicular to the longitudinal direction.

Advantageously, the locking panel is designed to cooperate with a lower edge of the free end when the latch is in the closed position.

"Lower edge of the free end" denotes a line of intersection of an outer surface of the curved portion extending the outer surface of the side wall and a substantially vertical surface, offset by a given value towards the exterior of the wall.

Advantageously, the upper supporting body comprises a bearing surface designed to cooperate with an upper edge of the free end of the curved portion.

"Upper edge of the free end" denotes a line of intersection of an inner surface of the curved portion extending the inner surface of the side wall and a substantially vertical surface, offset by a given value towards the exterior of the wall.

The lower and upper edges mark the thickness of the free end of the curved portion.

"A bearing surface designed to cooperate with an upper edge" means that when the removable handle is assembled on the cooking container, in a vertical cross-cut plane, the bearing surface keeps the upper edge from moving in a direction comprising a vertical component, upwards, and a horizontal component, radially outer to the cooking container.

Preferably, the means of pressurization comprise a compression spring and the thrust of the spring on the latch takes place in the longitudinal direction when the latch is in the closed position.

This arrangement makes it possible to adapt the position of the latch to the thickness and length of the free end.

Advantageously, the removable handle comprises means of maneuvering the toggle latch, said means of maneuvering comprising a lever, a connecting rod and the compression spring.

This arrangement makes it possible to obtain highly ergonomic means of maneuvering the latch.

Advantageously, the latch can be moved relative to the inner supporting body, the outer supporting body and the upper supporting body, all three of which are interdependent and fixed.

The invention also relates to an assembly formed by at least one cooking container comprising a side wall that is extended upwards by an outwardly-curved portion comprising a free end having an upper edge and a lower edge and equipped with a removable handle as described above.

The invention will be better understood from the study of the embodiment, which should not be considered as limiting and which is illustrated by the appended figures, in which.

It should be noted that in this document, the terms "horizontal", "vertical", "lower", "upper", "longitudinal", "transverse", "top", "bottom", used to describe the removable handle and the cooking container, refer to this removable handle when positioned for use, when it is fitted onto a side wall of the cooking container, said contained being placed on a horizontal plane.

Figure 1:
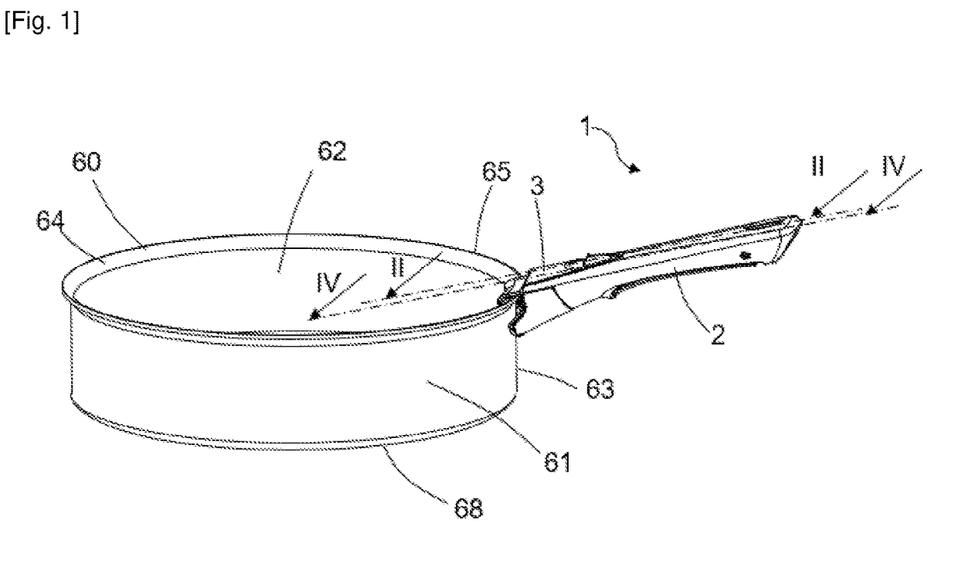
FIG. 1 illustrates a perspective view of a removable handle fitted to a cooking container according to a particular embodiment of the invention.
Figure 2:
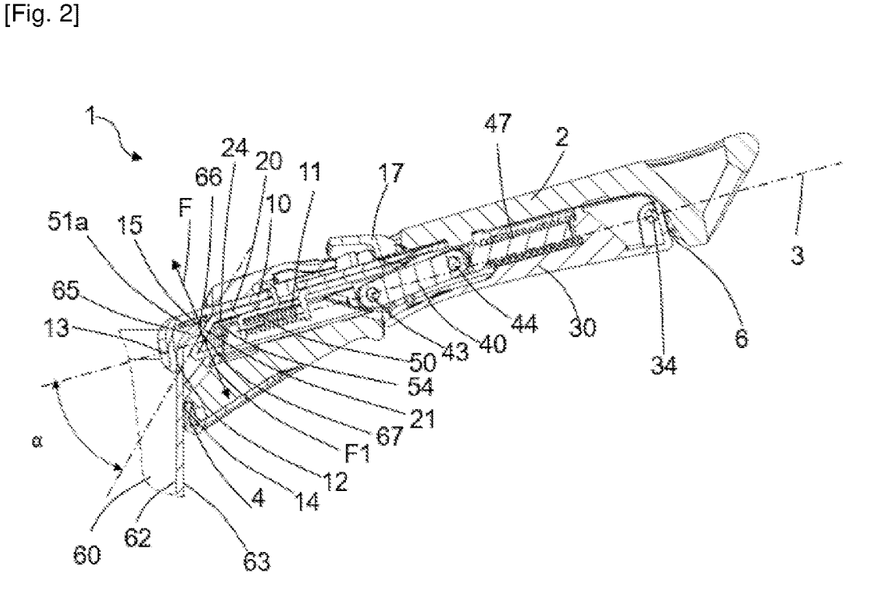
FIG. 2 illustrates a cross-sectional view of the removable handle along the median vertical cross-section II-II of FIG. 1.
Figure 3:
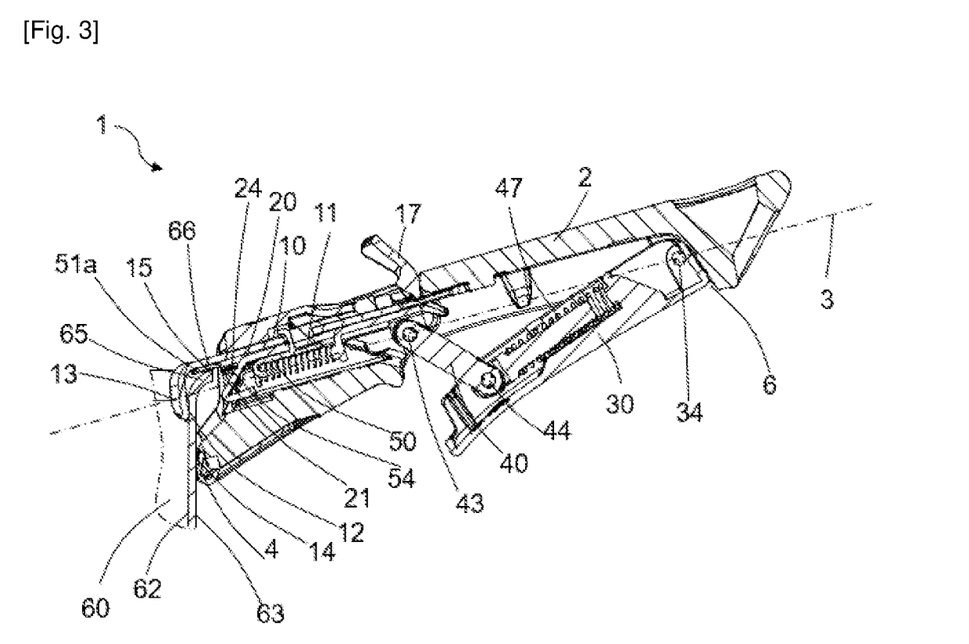
FIG. 3 illustrates a cross-sectional view of the removable handle along the median vertical cross-section II-II of FIG. 1, with the latch in in the open position.

As can be seen in FIGS. 1 to 3, a removable handle 1 is designed to cooperate with a cooking container 60 which comprises a horizontal bottom wall 68, a side wall 61 rising from the bottom wall 68, and an outwardly-curved portion 64. The side wall 61 comprises an inner surface 62 and an outer surface 63. The curved portion 64 extends the side wall 61 and delimits the upper opening of the cooking container 60. The curved portion 64 comprises a free end 65 with an upper edge 66 and a lower edge 67. The upper edge 66 and lower edge 67 are preferably superimposed in a vertical plane.

The removable handle 1 extends in a longitudinal direction 3. The removable handle 1 comprises a gripping body 2 which comprises, at a front end turned towards the cooking container 60, a front wall 4 forming an outer supporting body 14 designed to cooperate with the outer surface 63 of the side wall 61. In one vertical cross-section plane turned in the longitudinal direction 3 (FIGS. 2 and 3), the outer supporting body 14 is substantially vertical. The removable handle 1 comprises a median vertical plane that extends along the longitudinal direction 3 and which forms a plane of symmetry for the removable handle 1.

The removable handle 1 has a clip 50 made of metal material. The clip 50 comprises two lugs arranged on either side of a vertical median plane. The two tabs 51a, 51b form an upper supporting body 15 designed to cooperate with the upper edge 66 of the free end 65. The two tabs 51a, 51b extend along the longitudinal direction 3, at the front end.

The removable handle 1 comprises a structural piece 10 which is made of metal material. The structural piece 10 is substantially flat and comprises an end tab 13. The end tab 13 extends downwards and comprises an inner wall forming an inner supporting body 12 designed to cooperate with the inner surface 62 of the side wall 61.

The inner supporting body 12 and the outer supporting body 14 are offset in the longitudinal direction 3 (FIG. 3) to allow the introduction of the side wall 61 and the free end 65 during the assembly of the removable handle 1 on the cooking container 60. The removable handle 1 comprises a latching body formed by a latch 20 that can be moved in the longitudinal direction 3 between an open position (FIG. 3) and a closed position (FIG. 2). The latch 20 comprises a substantially flat central portion 22 that extends along the longitudinal direction 3. The clip 50 is attached under the structural piece 10 to define a receiving slot 23 that guides the movement of the central portion 22 of the latch 20. One front end of the latch 20 comprises a locking panel 21.

As can be seen in FIG. 3, when the latch 20 is in the open position, the locking wall 21 is designed to be distant from the upper supporting body 15 to enable the insertion of the side wall 61 between the inner supporting bodies 12 and the outer supporting bodies 14 and to allow the upper edge 66 of the free end 65 to rest against the upper supporting body 15.

Figure 4:
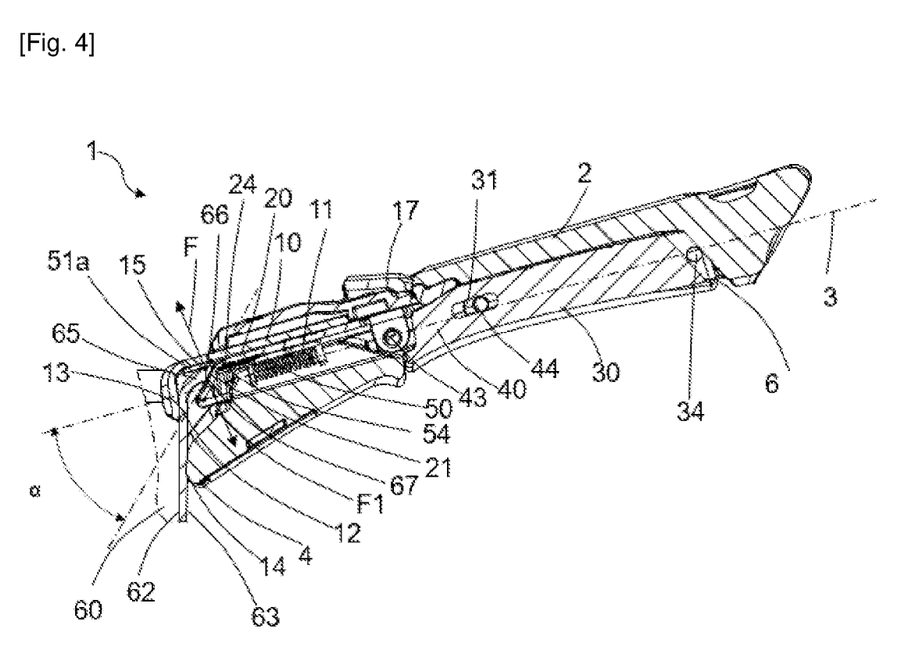
FIG. 4 illustrates a cross-sectional view of the removable handle along the vertical cross-section VI-VI, offset from the median vertical cross-section II-II of FIG. 1.

As can be seen in FIGS. 2 and 4, when the latch 20 is in the closed position, the locking wall 21 is designed to rest against the lower edge 67 of the free end 65 and thus block the upper edge 66 against the upper supporting body 15. In a vertical cross-section plane comprising the longitudinal direction 3, a straight line on the locking panel 21 and the longitudinal direction form an angle $\alpha$ comprised between 40 and 50°, preferably 45°.

Figure 7:
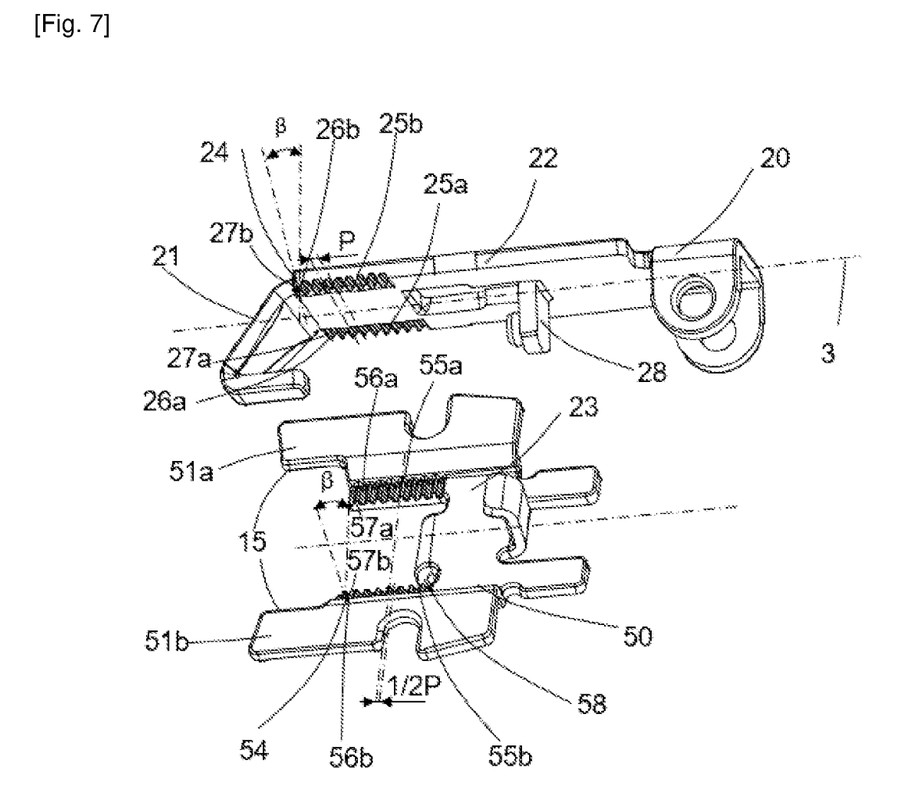
FIG. 7 illustrates an exploded perspective view of the latch and the clip of the removable handle illustrated in FIG. 6.

According to FIG. 7, the latch 20 comprises a protruding body 24 formed by a plurality of teeth 26a of a first right rack 25a and a plurality of teeth 26b of a first left rack 25b. The first right rack 25a and the first left rack 25b are arranged next to the locking panel 21. The first right rack 25a and the first left rack 25b extend along the longitudinal direction 3 and are arranged on either side of the vertical median plane. The plurality of teeth 26a of the first right rack 25a and the plurality of teeth 26b of the first left rack 25b have the same pitch P equal to 1.3 millimeters. The first right rack 25a and the first left rack 25b extend parallel to the longitudinal direction 3, being offset by half a pitch. Each tooth 26a of the first right rack 25a and each tooth 26b of the first left rack 25b extend downwards in a direction perpendicular to the longitudinal direction 3. Each tooth 26a of the first right rack 25a and each tooth 26b of the first left rack 25b comprise a flat face 27a, 27b tilted at an angle $\beta$ equal to 20° relative to a vertical direction perpendicular to the longitudinal direction 3.

Figure 5:
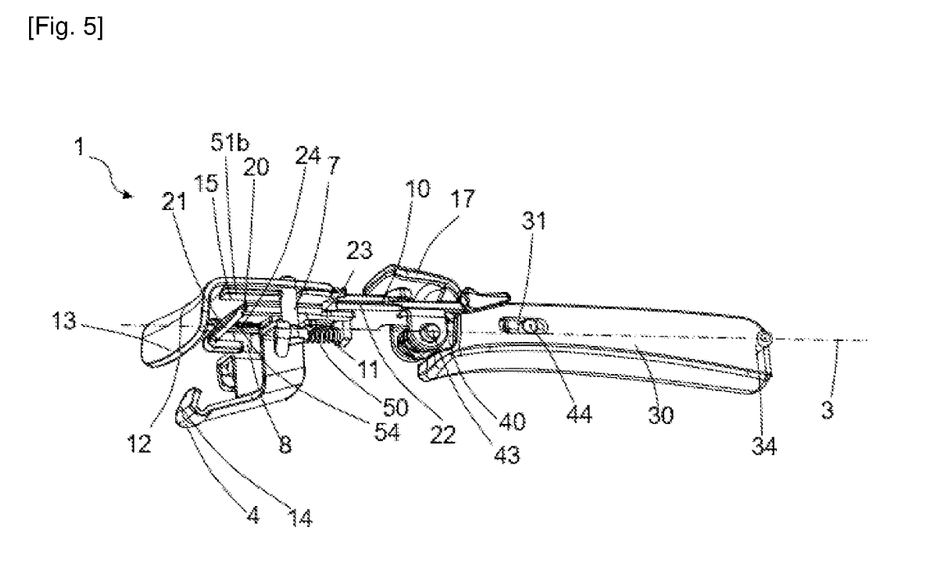
FIG. 5 illustrates a perspective view in a direction V of the removable handle illustrated in FIG. 1 without the body and without the cooking container.

The clip 50 is secured to the structural piece 10 which is itself secured to the gripping body 2 and the front wall 4 by means of two screws 7, 8 (FIG. 5). The clip 50 comprises a hollow body 54 formed by a plurality of notches 56a defining a second right rack 55a and a plurality of notches 56b defining a second left rack 55b. The second right rack 55a and the second left rack 55b extend along the longitudinal direction 3 and are arranged on either side of the vertical median plane. The plurality of notches 56a of the second right rack 55a and the plurality of notches 56b of the second left rack 55b have the same pitch P equal to 1.3 millimeters. The second right rack 55a and the second left rack 55b extend parallel to the longitudinal direction 3, being offset by half a pitch P. Each notch 56a of the second right rack 55a and each notch 56b of the second left rack 55b extends upwards in a direction perpendicular to the longitudinal direction 3. Each notch 56a of the second right rack 55a and each notch 56b of the second left rack 55b comprise a flat face 57a, 57b tilted at an angle $\beta$ equal to 20° relative to a vertical direction perpendicular to the longitudinal direction 3.

When the latch 20 is in the closed position, the protruding body 24 and the hollow body 54 are fitted into each other to keep the latch 20 from recoiling when the free end 65 generates on the blocking panel 21 a force comprising a vertical component F1, turned downwards, and whose intensity is greater than a predetermined value equal to 0.05 times the intensity of the vertical component F measured when the latch 20 is in the closed position and which is equal to approximately 25 N, i.e. 1.25 N. By the intensity of the vertical component F measured when the latch 20 is in the closed position, it is understood that the intensity of the vertical component F is measured with the action of a means of pressurization 47 as the sole stress. The central portion 22 of the latch 20 is guided in its movement in the slot 23 with a vertical play sized to enable the protruding body to move into or out of the hollow body.

Figure 6:
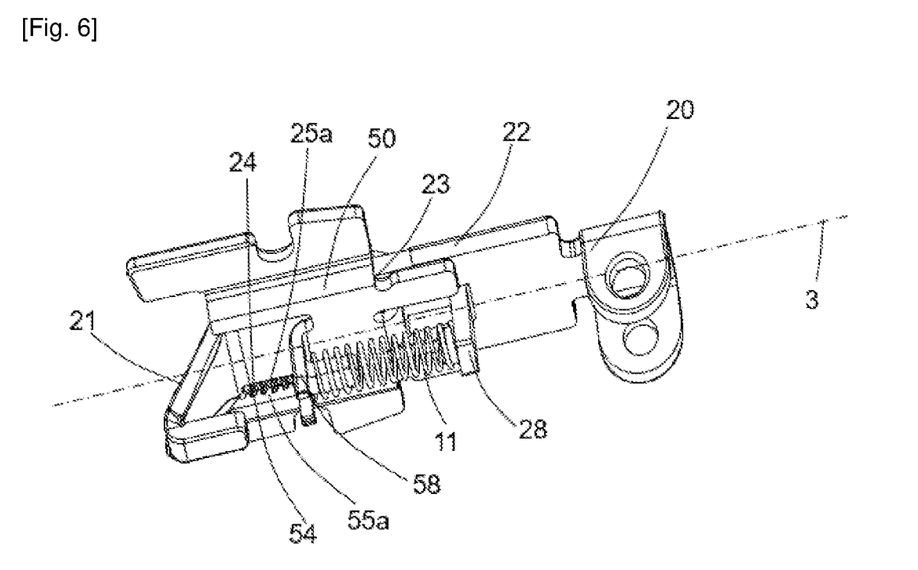
FIG. 6 illustrates a perspective view in a direction VI of the latch and the clip of the removable handle illustrated in FIG. 5.

As can be seen in FIGS. 5 and 6, the removable handle 1 comprises a means of recoil of the latch 20 placed between a tab 58 borne by the clip 50 and a stop 28 borne by the latch 20. This means of recoil is provided by a spring 11 which is compressed when the latch 20 is in the closed position and which is suitable for applying a return force on the stop 28 to drive the latch 20 towards its open position.

According to FIGS. 2 and 3, the removable handle 1 comprises means of moving the latching body formed by the latch 20. The means of movement comprise a lever 30 which is such that it can pivot on the gripping body 2 along a pivoting axis 34 extending in a transverse direction, perpendicular to the longitudinal direction 3, and a connecting rod 40 which enable the movement of the latch 20 when the lever 30 is pivoted. The connecting rod 40 is mounted such that it can pivot, by a first end to the latch 20 along an axis 43, and by a second end to the lever 30 along an axis 44 which is slide-mounted in an oblong opening 31 made in the lever 30 (FIG. 5).

The lever 30 is arranged on a lower face 6 of the gripping body 2 and can be moved between a closed position and an open position after moving through an intermediate position with unstable balance. When the lever 30 in the closed position, the latch 20 is in the closed position and when the lever 30 in the open position, the latch 20 is in the open position. In addition, the means of movement also comprise a spring 47 which is arranged between the slide-mounted axis 44 and a transverse wall 32 of the lever 30. This compression spring 47 makes it possible to adjust the position of the latch 20 in a closed position to the thickness of the side wall 61 of the cooking container 60.

According to FIG. 2, when the lever 30 is in the closed position, the axis 44 around which the second end 42 pivots is located above a line passing through the pivoting axis 34 and the axis 43. The second end 42 is held in contact with the structural piece 10 under the action of the compression spring 47. Thus, the latch 20 naturally stays in its closed position, without the user having to keep any effort on the removable handle 1. The intermediate position with unstable balance of the lever 30 is reached when the axis 44 around which the second end 42 pivots is moved under the line passing through the pivoting axis 34 and the axis 43.

As can be seen in FIGS. 1 to 5, the removable handle 1 comprises an opening button 17 that enables the lever 30 to be moved from its initial closing position to beyond its intermediate position with unstable balance. The opening button 17 is arranged on an upper face of the gripping body 2. The opening button 17 can be turned around a transverse axis, horizontal to the longitudinal direction 3 of the removable handle 1. The opening button 17 can be moved between a lowered resting position in which the lever 30 is in its closed position, an intermediate raised position in which the lever is in its intermediate position in which balance is unstable, and a raised position in which the lever 30 is in its open position.

In operation, to disassemble the removable handle 1 from the cooking container 60, the user grasps the gripping body 2 and uses his thumb to pivot the opening button 17 from the lowered resting position in which the lever 30 is in its closed position to the raised position in which the lever 30 is in its open position. The movement of the lever 30 from its closed position to its open position causes the movement of the latch 20 from its closed position to its open position by means of the connecting rod 40.

To assemble the removable handle 1 on the cooking container 60, the user grasps the gripping body 2 and, following the same procedure as that described above, moves the latch 20 into its open position. The user introduces the free end 65 of the curved portion 64 between the inner supporting body 12 and the outer supporting body 14 to bring the inner surface 62 of the side wall 61 against the inner supporting body 12 and the outer surface 63 against the outer supporting body 14, and also to bring the upper edge 66 against the two lugs 51a, 51b. Then, the user presses on the lever 30 to move it from its open position to its closed position and thus moves the latch 20 from its open position to its closed position. The locking panel 21 then rests against the lower edge 67 of the free end 65 and thus locks the upper edge 66 against the two lugs 51a, 51b. The free end 65 of the curved portion 64 then generates on the locking panel 21 a force which comprises a component F1 opposite the vertical locking component F, turned downwards, which moves the locking panel 21 downwards. At least one of the teeth 26a, 26b of the first right rack 25a or of the first left rack 26a is fitted in one of notches 56a, 56b of the second right rack 55a or of the second left rack 55b and the latch 20 moves into the closed position. For special uses, especially if the user wants to flip the food contained in the cooking container 60, for example to flip crepes, and, holding the removable handle 1 on the cooking container 60, makes an up-and-down movement and abruptly slows the movement at the end, the latch 20 cannot recoil.

Of course, the invention is in no way limited to the embodiments described and illustrated, which have only been provided by way of example. Changes can still be made, particularly with regard to the constitution of the various elements or by substituting technical equivalents, without departing from the scope of protection of the invention.

In an alternative embodiment, in the closed position, the latch 20 can be moved between an unlatched closed position in which the protruding body 24 and the hollow body 54 are separate from each other and a latched closed position in which the protruding body 24 and the hollow body 54 are fitted into each other to prevent the latch 20 from recoiling when the free end 65 generates on the locking panel 21 a force comprising a component F1 opposite to the vertical locking component F measured when the latch 20 is in the closed position. In case of heavy loads on the free end 65 on the locking panel 21, the latch 20 moves to the locked closed position.

The invention claimed is:

1. A removable handle configured to cooperate with a cooking container having a side wall that is extended upwards by an outwardly-curved portion comprising a free end, said removable handle extending in a longitudinal direction and comprising:
   an inner supporting body and an outer supporting body configured to rest against, respectively, an inner surface and an outer surface of the side wall;
   an upper supporting body configured to rest against the free end;
   a latch configured to be moved between an open position and a closed position, the latch comprising a locking panel configured to be distant from the inner supporting body when the latch is in the open position and configured to generate a force on the free end when the latch is in the closed position, under an action of a means of pressurization, said force comprising a vertical component F for locking the free end against the upper supporting body,
   wherein the latch further comprises a protruding body and said removable handle further comprises a hollow body or reciprocally and
   wherein, in the closed position, the protruding body and the hollow body are fitted into each other to prevent the latch from recoiling when the free end generates on the locking panel a force comprising a component F1 opposite to the vertical component F and whose intensity is greater than a predetermined value, and
   wherein the protruding body comprises a plurality of teeth forming at least a first rack and the hollow body comprises a plurality of receiving notches forming at least a second rack, the first rack and the second rack comprising a single pitch P.

2. The removable handle according to claim 1, wherein the protruding body and the hollow body extend in a vertical plane, parallel to the longitudinal direction, and
   wherein the protruding body or the hollow body is configured to be moved in a vertical direction perpendicular to the longitudinal direction between a locked position in which the latch cannot recoil and an unlocked position in which the latch can recoil.

3. The removable handle according to claim 1, wherein the protruding body is arranged near the locking panel.

4. The removable handle according to claim 1, wherein the predetermined value of the intensity of the component F1 is greater than 0.05 times the intensity of the vertical component F measured when the latch is in the closed position.

5. The removable handle according to claim 1, wherein at least one of the plurality of teeth comprises a flat face tilted at an angle β relative to a vertical direction perpendicular to the longitudinal direction, the angle β being greater than 15°, and wherein at least one of the plurality of receiving notches comprises a flat face tilted at the same angle.

6. The removable handle according to claim 1, wherein the at least one first rack comprises a first right rack and a first left rack, and wherein the at least one second rack comprises a second right rack and a second left rack, the first right rack, the first left rack, the second right rack, and the second left rack comprising the single pitch P.

7. The removable handle according to claim 6, wherein the first right rack and the first left rack extend parallel to the longitudinal direction while being offset by half the pitch P, or wherein the second right rack and the second left rack extend parallel to the longitudinal direction while being offset by half the pitch P.

8. The removable handle according to claim 1, wherein the latch is configured to be moved in the longitudinal direction, and wherein the locking panel is inclined so as to form with the longitudinal direction in a vertical cross-cut plane comprising the longitudinal direction, an angle α greater than 45°.

9. The removable handle according to claim 1, wherein the means of pressurization comprise a compression spring, and wherein the thrust of the spring on the latch takes place in the longitudinal direction when the latch is in the closed position.

10. The removable handle according to claim 9, further comprising means of maneuvering the latch, said means of maneuvering comprising a lever, a connecting rod and the compression spring.

11. An assembly formed by at least one cooking container comprising the side wall which is extended upwards by the outwardly-curved portion comprising the free end with the upper edge and the lower edge and the removable handle according to claim 1.

* * * * *